No. 727,473. PATENTED MAY 5, 1903.
G. SPENCE.
BICYCLE SUPPORTING BAR.
APPLICATION FILED SEPT. 14, 1901.
NO MODEL.
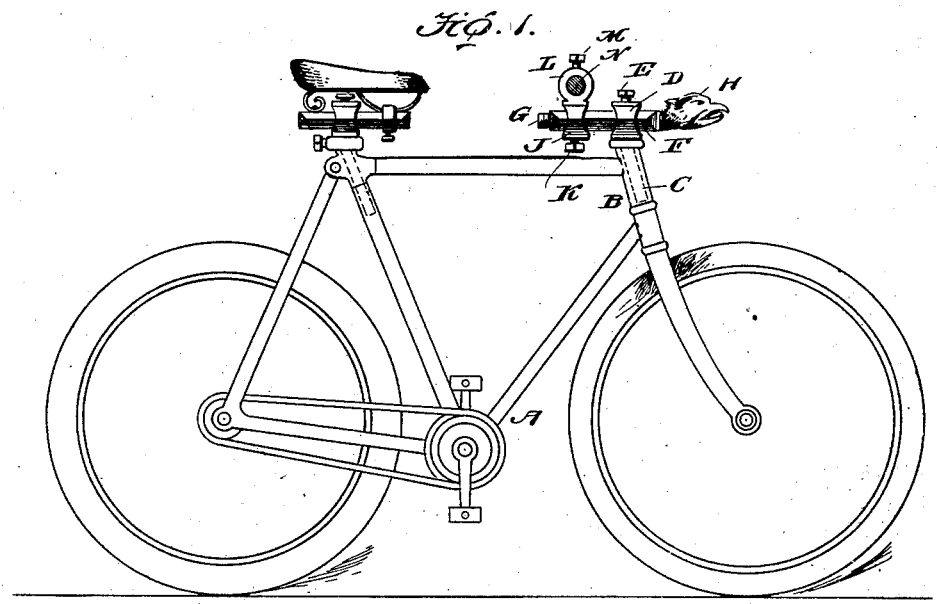
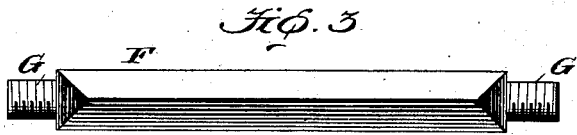
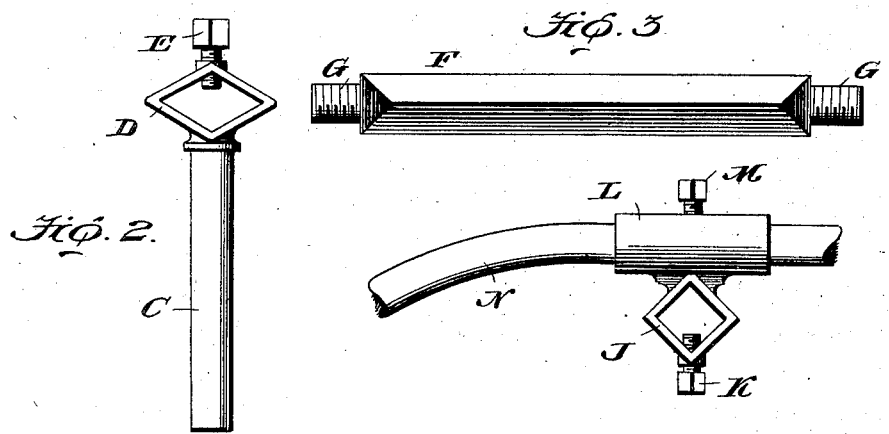
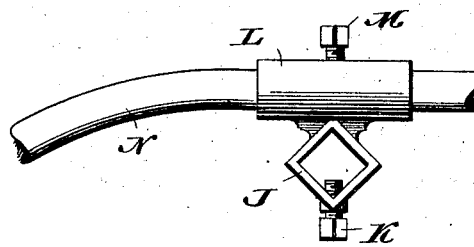
WITNESSES:
INVENTOR
Gideon Spence
BY
ATTORNEY No. 727,473.　　　　　　　　　　　　　　　　　　　　Patented May 5, 1903.

UNITED STATES PATENT OFFICE.

GIDEON SPENCE, OF NEWPORT, RHODE ISLAND.

BICYCLE SUPPORTING-BAR.

SPECIFICATION forming part of Letters Patent No. 727,473, dated May 5, 1903.

Application filed September 14, 1901. Serial No. 75,400. (No model.)

*To all whom it may concern:*

Be it known that I, GIDEON SPENCE, a citizen of the United States, residing at Newport, in the county of Newport and State of Rhode Island, have invented certain new and useful Improvements in Bicycle Supporting-Bars, of which the following is a specification.

My invention relates to improvements in bicycles; and the object of my invention is the provision of simple and practical means for obtaining the desired adjustments of the handle-bar of the bicycle according to the requirements of the rider.

To attain the desired object, my invention consists of a bicycle supporting-bar embodying novel features of construction and combination of parts substantially as disclosed herein.

Figure 1 represents a side view of a bicycle having my improvements. Fig. 2 represents a front view of the steering-head attachment. Fig. 3 represents a detail view of the parts detached.

In the drawings, A designates a bicycle of the well-known form, in the steering-head B of which fits the shank or stem C, carrying the angular sleeve D, provided with the set-screw E for holding at the proper adjustment the angular bar F, having the threaded ends G, upon either of which may be screwed the ornamental head H, which while serving as an ornament can also be utilized for holding a flag, lamp, or other article. Also mounted upon said angular bar is the angular sleeve J, retained by the set-screw K and formed with the annular band L, having a set-screw M for holding at any desired adjustment the handle-bar N, as will be understood.

From the drawings and description it is evident that I provide simple, inexpensive, and practical means for securing any desired adjustment of the handle-bar.

I claim—

In a bicycle the combination with the steering-head, of a shank, the angular sleeve carried thereby, a set-screw adjustable in said sleeve, an angular bar fitting said sleeve, an angular sleeve fitted to said angular bar having a set-screw, the said sleeve formed with an annular band at right angles to said angular bar and adapted to receive the handle-bar, and a set-screw adjustable in said annular sleeve independent of the first-mentioned set-screw and adapted to engage the handle-bar, all substantially as shown and described.

In testimony whereof I affix my signature in presence of two witnesses.

GIDEON SPENCE.

Witnesses:
　MARY IDA SPENCE,
　CATHERINE A. SPENCER.